(12) United States Patent
Goto et al.

(10) Patent No.: US 8,991,870 B2
(45) Date of Patent: Mar. 31, 2015

(54) TUBULAR THREADED JOINT HAVING IMPROVED HIGH TORQUE PERFORMANCE

(75) Inventors: Kunio Goto, Kobe (JP); Yasuhiro Yamamoto, Wakayama (JP)

(73) Assignees: Nippon Steel & Sumitomo Metal Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 70 days.

(21) Appl. No.: 13/881,440

(22) PCT Filed: Nov. 4, 2011

(86) PCT No.: PCT/JP2011/076016
§ 371 (c)(1),
(2), (4) Date: Jul. 12, 2013

(87) PCT Pub. No.: WO2012/060472
PCT Pub. Date: May 10, 2012

(65) Prior Publication Data
US 2013/0276294 A1     Oct. 24, 2013

(30) Foreign Application Priority Data

Nov. 5, 2010  (JP) ................. 2010-248790

(51) Int. Cl.
*F16L 7/00* (2006.01)
*F16L 9/00* (2006.01)
(Continued)

(52) U.S. Cl.
CPC ............. *F16L 15/06* (2013.01); *F16L 15/08* (2013.01); *B05D 3/007* (2013.01); *B05D 3/065* (2013.01); *C10M 169/041* (2013.01); *C10M 169/044* (2013.01); *C10M 2201/041* (2013.01); *C10M 2205/143* (2013.01); *C10M 2205/163* (2013.01); *C10M 2205/183* (2013.01); *C10M 2207/125* (2013.01); *C10M 2207/1253* (2013.01); *C10M 2207/126* (2013.01); *C10M 2207/14* (2013.01); *C10M 2207/1403* (2013.01); *C10M 2207/203* (2013.01); *C10M 2219/046* (2013.01); *C10M 2229/02* (2013.01); *C10M 2229/048* (2013.01); *C10N 2220/082* (2013.01); *C10N 2230/06* (2013.01); *C10N 2250/10* (2013.01); *C10N 2250/12* (2013.01); *C10N 2280/00* (2013.01); *F16L 15/00* (2013.01)
USPC .......... 285/94; 427/398.1; 427/558; 508/118; 508/205

(58) Field of Classification Search
CPC .......... F16L 15/08; B05D 3/007; B05D 3/065
USPC ........... 285/94; 427/398.1, 558; 508/118, 205
See application file for complete search history.

(56) References Cited

FOREIGN PATENT DOCUMENTS

| JP | 07-167206 | 7/1995 |
|----|-----------|--------|
| JP | 2002-173692 | 6/2002 |

(Continued)

*Primary Examiner* — Michael C Miggins
(74) *Attorney, Agent, or Firm* — Clark & Brody (57) ABSTRACT

A lubricating coating which can prevent the occurrence of galling even when makeup is carried out with a high torque and which has excellent rust preventing properties is formed on the contact surfaces of a pin and/or a box of a tubular threaded joint. The lubricating coating contains copolymer particles made from particles of an acrylic-silicone copolymer with an average particle diameter of 10-50 μm dispersed in a highly viscous matrix made from a mixture of a rosin-based substance selected from rosin and its derivatives, wax, a metal soap, and a basic metal salt of an aromatic organic acid (such as highly basic Ca sulfonate).

12 Claims, 4 Drawing Sheets

(51) Int. Cl.
*F16L 11/00* (2006.01)
*F16L 21/00* (2006.01)
*F16L 15/06* (2006.01)
*C10M 169/04* (2006.01)
*F16L 15/00* (2006.01)
*F16L 15/08* (2006.01)
*B05D 3/00* (2006.01)
*B05D 3/06* (2006.01)

(56) References Cited

FOREIGN PATENT DOCUMENTS

| | | |
|---|---|---|
| JP | 2004-53013 | 2/2004 |
| JP | 2004-137371 | 5/2004 |
| WO | 2009/057754 | 5/2009 |

(a) Initial stage of shouldering (low pressure)

Highly viscous matrix

Copolymer particles (b) Just before completion of makeup (high pressure)

TUBULAR THREADED JOINT HAVING IMPROVED HIGH TORQUE PERFORMANCE

TECHNICAL FIELD

The present invention relates to a tubular threaded joint for use in makeup of steel pipes and particularly oil country tubular goods and to surface treatment thereof. A tubular threaded joint according to the present invention can exhibit excellent galling resistance with certainty without application of a lubricating grease to such as compound grease which in the past has been applied to threaded joints when connecting oil country tubular goods. Accordingly, a tubular threaded joint according to the present invention can avoid the adverse effects on the global environment and humans caused by compound grease. Furthermore, it does not readily undergo yielding and can realize a metal-to-metal seal in a stable manner even when the makeup operation is carried out with a high torque.

BACKGROUND ART

Oil country tubular goods such as tubing and casing for use in the excavation of oil wells for recovery of crude oil or gas oil are normally connected with each other using tubular threaded joints. In the past, the depth of oil wells was 2,000-3,000 meters, but in deep wells such as recent offshore oil fields, the depth can reach 8,000-10,000 meters. The length of an oil country tubular good is typically 10 some meters, and tubing having a fluid such as crude oil flowing in its interior is surrounded by a plurality of casings, and hence the number of oil country tubular goods which are connected together can reach a huge number of a thousand or more.

In their environment of use, tubular threaded joints for oil country tubular goods are subjected to loads in the form of tensile forces in the axial direction caused by the weight of oil country tubular goods and the joints themselves, compound pressures such as inner and outer pressures, and geothermal heat. Therefore, they must be able to guarantee gas tightness without being damaged even under such severe environments.

A typical tubular threaded joint used for connecting oil country tubular goods has a pin-box structure constituted by a member having male (external) threads and referred to as a pin and a member having female (internal) threads and referred to as a box. Typically, a pin is formed on both ends of an oil country tubular good, and a box is formed on the inner surface of both sides of a threaded joint component referred to as a coupling.

Figure 1:
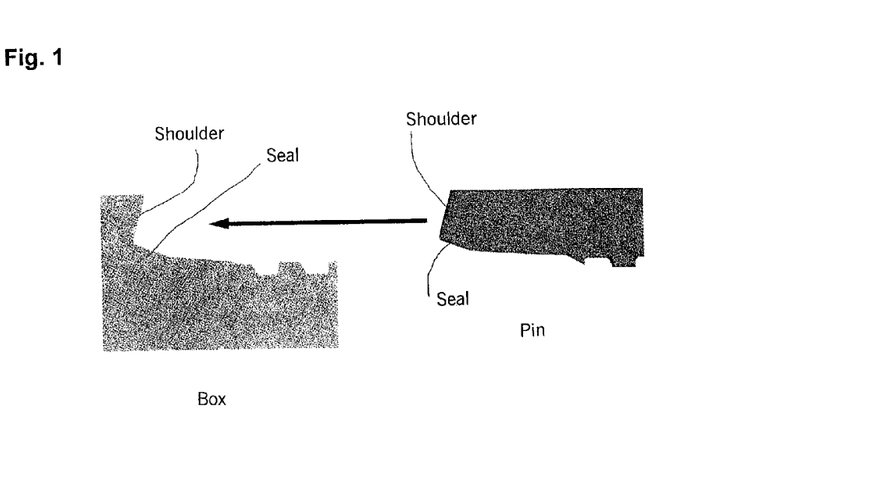
FIG. 1 schematically shows the shoulder portions and the seal portions of a pin and a box of a special threaded joint.

As shown in FIG. 1, a threaded joint which has excellent gas tightness and is referred to as a special threaded joint has a seal portion a shoulder portion (also referred to as a torque shoulder) on each of the pin and the box. The seal portion is fainted on the outer periphery near the end surface closer to the end of the pin than the male threads and on the inner periphery on the base of the female threads of the box, and the shoulder portion is formed on the end surface at the end of the pin and on the corresponding rearmost portion of the box. The seal portion and the shoulder portion constitute an unthreaded metal contact portion of the pin or box of the tubular threaded joint, and the unthreaded metal contact portion and the threaded portion (male or female threads) constitute a contact surface of the pin or box. By inserting one end (a pin) of an oil country tubular good into a coupling (a box) and tightening the male threads of the pin and the female threads of the coupling until the shoulder portions of the pin and the box are made to abut and then interfere with a suitable torque, the seal portions of the pin and the box intimately contact each other and form a metal-to-metal seal, thereby maintaining the gas tightness of the threaded joint.

When tubing or casing is being lowered into an oil well, due to various problems, a threaded joint which was once tightened is sometimes loosened, the threaded joints are lifted out of the oil well, then they are retightened and lowered into the well. API (American Petroleum Institute) requires galling resistance so that gas tightness is maintained without the occurrence of unrepairable seizing referred to as galling even when a joint undergoes tightening (makeup) and loosening (breakout) 10 times for a joint for tubing and 3 times for a joint for casing.

In order to increase galling resistance and gas tightness when performing makeup of a threaded joint for oil country tubular goods, a viscous liquid lubricant (a lubricating grease) which is referred to as compound grease and which contains heavy metal powders is applied to a contact surface of a threaded joint (namely, to the threads and the unthreaded metal contact portion of the pin or box). Compound grease is prescribed by API Bulletin 5A2.

In the past, it has been proposed to subject the contact surface of a threaded joint to various types of surface treatment such as nitriding, various types of plating including zinc plating and composite plating, and phosphate chemical conversion treatment to form one or more layers in order to increase the retention of compound grease or improve sliding properties. However, as described below, the use of compound grease poses the threat of adverse effects on the environment and humans.

Compound grease contains a large amount of heavy metal powders such as zinc, lead, and copper. At the time of makeup of a threaded joint, grease which has been applied is washed off or overflows to the exterior surface, and there is a possibility of its producing adverse effects on the environment and particularly on marine life due to harmful heavy metals such as lead. In addition, the process of applying compound grease worsens the work environment and working efficiency, and there is a concern of its toxicity towards humans.

In recent years, as a result of the enactment in 1998 of the OSPAR Convention (Oslo-Paris Convention) aimed at preventing marine pollution in the Northeast Atlantic, strict environmental restrictions are being enacted on a global scale, and in some regions, the use of compound grease is already being regulated. Accordingly, in order to avoid harmful effects on the environment and humans during the excavation of gas wells and oil wells, a demand has developed for threaded joints which can exhibit excellent galling resistance without using compound grease.

As a threaded joint which can be used for connecting oil country tubular goods without application of compound grease, the present applicants proposed in Patent Document 1 a tubular threaded joint having a viscous liquid or semisolid lubricating coating formed thereon, and in Patent Document 2, they proposed a tubular threaded joint which suppresses tackiness of the surface of a threaded joint and reduces adhesion of foreign materials such as dirt, sand, and trash, which is a drawback of a viscous liquid or a semisolid lubricating coating.

Patent Document 1: JP 2002-173692 A
Patent Document 2: JP 2004-53013 A

SUMMARY OF THE INVENTION

In a special threaded joint like the one shown in FIG. 1 having a seal portion and a shoulder portion, gas tightness is guaranteed by forming a metal-to-metal seal between the seal portions of the pin and the box at the time of makeup.

Figure 2:
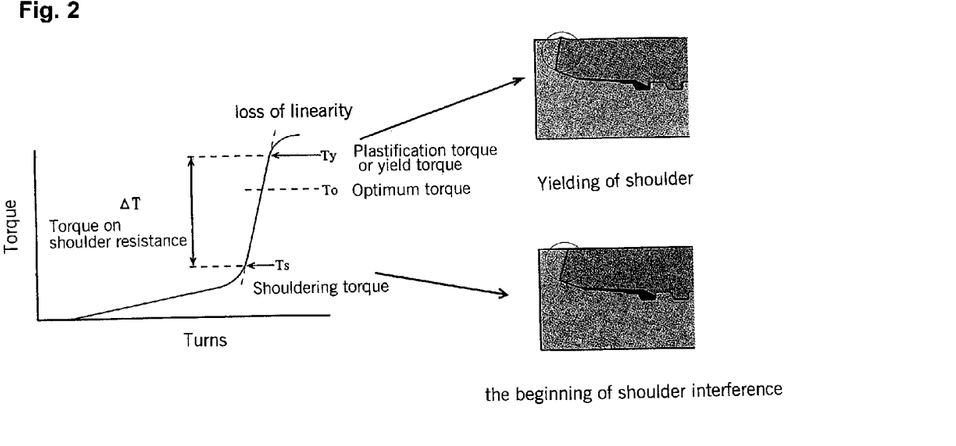
FIG. 2 shows a typical torque chart at the time of makeup of a special threaded joint.

FIG. 2 shows a torque chart (ordinate: torque, abscissa: number of turns) of this type of threaded joint at the time of makeup. As shown in the figure, as the number of turns increases, initially the torque gradually increases due to the threads of the pin and box contacting each other. Subsequently, the seal portions of the pin and the box contact and the rate of increase of torque increases. Finally, the shoulder portions at the tip of the pin and the shoulder portion of the box contact each other (a state referred to as shouldering), and when they begin to interfere with each other (the torque at the start of this interference is referred to as the shouldering torque and is indicated as Ts), the torque abruptly increases. Makeup is completed when the torque reaches a prescribed makeup torque.

However, with a special threaded joint used in deep oil wells in which compressive stresses and bending stresses are applied, makeup is sometimes carried out at a torque which is higher than a usual torque so that loosening will not take place. In this case, the shoulder portion at the end surface of the pin and the shoulder portion of the box which contacts it sometimes undergoes yielding (the torque at the time of yielding is referred to as the yield torque and is indicated as Ty), and as shown in FIG. 2, the shoulder portions sometimes plastically deform.

In a threaded joint which is made up with a high torque, it is advantageous for the value of Ty−Ts (the torque-on-shoulder resistance, which is indicated as $\Delta T$) to be large. However, with the tubular threaded joints described in Patent Documents 1 and 2 which have a viscous liquid or semisolid lubricating coating, Ty becomes low compared to when a conventional compound grease is applied. As a result, it was found that $\Delta T$ becomes small and there is the problem that makeup cannot be carried out with a high torque since the shoulder portions end up yielding at a low makeup torque.

The optimum torque in FIG. 2 means the torque that is optimal for the completion of makeup with achieving an amount of interference in the seal portions which is necessary for maintaining gas tightness, and a proper value therefor is prescribed depending on the internal diameter and the type of a joint.

The object of the present invention is to provide a tubular threaded joint having a lubricating coating which does not contain harmful heavy metals such as lead which impose a burden on the global environment, which imparts galling resistance, gas tightness, and rust preventing properties, and which can provide a large $\Delta T$ to the joint, thereby preventing yielding of the shoulder portions of the joint even when makeup is carried out with a high torque.

It has been found that even if the composition of a lubricating coating is simply varied so as to modify the coefficient of friction with the object of increasing $\Delta T$, Ts and Ty generally behave in the same manner as each other. For example, if the coefficient of friction of a lubricating coating increases, Ty increases, but Ts also increases (a phenomenon referred to as high shouldering). As a result, in the worst case, the shoulder portions of a pin and a box do not contact each other at a prescribed makeup torque, and there are even situations in which makeup cannot be completed (a phenomenon referred to as no shouldering).

The present inventors found that with a lubricating coating formed only of substances imposing absolutely no burden or almost no burden on the global environment, by employing a coating structure in which particular low friction copolymer particles are dispersed in a highly viscous matrix, Ts can be suppressed to a low value and Ty can be increased so that $\Delta T$ can be increased. The operating mechanism of this lubricating coating is conjectured to be roughly as follows.

FIGS. 3(a) and 3(b) show the state of the contact surfaces of a pin and a box at the start of makeup (shouldering) and just before the completion of makeup (namely, under a low pressure and a high pressure), respectively, when the contact surface of one of a pin and a box has a lubricating coating with the above-described structure and the contact surface of the other member remains an uncoated metal surface.

As shown in FIG. 3(a), in the initial stage of shouldering when the pressure is still low, the metal surface of the opposing member primarily contacts the low friction copolymer particles protruding from the lubricating coating, so the coefficient of friction is low, and accordingly Ts is low. On the other hand, as shown in FIG. 3(b), under a high pressure just before the completion of makeup, the metal surface of the opposing member also contacts the coating made of a highly viscous matrix, and the coefficient of function increases. As a result, Ty becomes high, and $\Delta T$ becomes large.

Under a high pressure, the copolymer particles which protruded from the lubricating coating are embedded in the coating primarily due to their plastic deformation. When released from the pressure, the copolymer particles recover the initial state in which they protrude from the lubricating coating, although they wear to some extent. Therefore, the state shown in FIGS. 3(a) and 3(b) is also maintained in the second and later cycle of makeup, and satisfactory galling resistance is maintained.

The present invention is a tubular threaded joint comprising a pin and a box, each having contact surface including threads and an unthreaded metal contact portion, characterized in that the contact surface of at least one of the pin and the box has a lubricating coating comprising particles of a copolymer of a resin selected from a silicone resin and a fluorocarbon resin with a thermoplastic resin dispersed is in a viscous matrix having a complex shear viscosity of at least 3000 Pa-sec at 25° C.

The matrix having a complex shear viscosity of at least 3000 Pa-sec at 25° C. can be said to be a highly viscous matrix. Both a silicone resin and a fluorocarbon resin are known to have a low friction (hereunder these resins being collectively referred to as low friction resins), and a copolymer of such resin with a thermoplastic resin also has a low friction. Therefore, the lubricating coating used in the present invention is characterized by having particles of a low friction copolymer dispersed in a highly viscous matrix.

The highly viscous matrix exhibits a high viscous drag in a sliding interface and therefore serves to increase the friction of the lubricating coating. On the other hand, the copolymer particles serve to decrease the frictional drag in a sliding interface.

During the formation of a lubricating coating, the low friction copolymer particles are protruded from the coating surface such that the silicone or fluorocarbon resin portion of the copolymer particles face outwards due to the action of surface tension and the affinity of the highly viscous matrix which is higher for the thermoplastic resin of the copolymer than for the silicone or fluorocarbon resin thereof, thereby forming the coating structure schematically shown in FIG. 3(a). As a result, as described above, under a low pressure, the surface of the opposing member primarily contacts the low friction copolymer particles protruding from the surface of the lubricating coating, thereby decreasing the coefficient of friction of the coating, leading to a low Ts. On the other hand, under a high pressure, the protruding low friction copolymer particles are embedded in the coating primarily due to their plastic deformation, and the surface of the opposing member also contacts the highly viscous matrix, thereby increasing the coefficient of friction of the entire coating, leading to a high Ty. In this manner, a large ΔT can be realized.

Thus, in a threaded joint according to the present invention, the coefficient of action between the contact surfaces of a pin and a box at the time of sliding under a low pressure differs from that at the time of sliding under a high pressure. Specifically, the coefficient of friction measured under a pressure of 1 GPa is greater than that measured under a pressure of 0.3 GPa. The difference calculated by subtracting the coefficient of friction measured at 0.3 GPa from that measured at 1 GPa is preferably at least 0.02, more preferably at least 0.03, and most preferably at least 0.05.

The coefficient of friction of a lubricating coating can be measured by the FALEX Pin & Vee method (referred to hereinafter as the FALEX method) using a FALEX Pin & Vee Block Machine in accordance with ASTM D 2625 (wear life and load-carrying capacity of solid film lubricants) or ASTM D2670 (wear properties of fluid lubricants).

In the present invention, the coefficient of friction of the contact surfaces of a tubular threaded joint is measured using a test piece made of the same steel as the tubular threaded joint and having the same solid lubricating coating formed after the same preparatory surface treatment. The measurement is carried out under a high pressure of 1 GPa which corresponds to the maximum pressure applied to the seal portions at the time of makeup of a tubular threaded joint and under a low pressure of 0.3 GPa. In this manner, an average coefficient of friction in a steady friction state prior to the occurrence of galling is determined under each of these two pressures for comparison to each other. Of course, another conventional laboratory friction tester may be used to measure the friction of coefficient. Whichever method or apparatus is employed, the coefficient of friction of a lubricating coating used in the present invention measured at a high pressure (1 GPa) is higher than that measured at a low pressure (0.3 GPa) when measurement is carried out under the same conditions other than the applied pressure. In general, a coefficient of friction of 0.1 or greater is considered to be high friction, and a coefficient of friction of 0.05 or lower is considered to be low friction.

The copolymer particles are preferably spherical particles, and more preferably they are spherical particles of an acrylic-silicone copolymer with an average particle diameter of 10-50 μm, and their content in the lubricating coating is preferably 0.1-20 mass %.

The highly viscous matrix is preferably formed from at least one substance selected from rosin-based materials including rosin and its derivatives, waxes, metal soaps, and basic metal salts of an aromatic organic acid.

The lubricating coating may further contain graphite as a friction modifier. The thickness of the lubricating coating is preferably 10-500 μm.

The contact surface of at least one of the pin and the box having the lubricating coating preferably undergoes, before the formation of the lubricating coating, preparatory surface treatment by a method selected from at least one of blasting, pickling, phosphate chemical conversion treatment, oxalate chemical conversion treatment, borate chemical conversion treatment, electroplating, impact plating, and a combination of these.

When the contact surface of only one member of the pin and the box has the lubricating coating, the contact surface of the other member of the pin and the box preferably undergoes surface treatment by a method selected from at least one of blasting, pickling, phosphate chemical conversion treatment, oxalate chemical conversion treatment, borate chemical conversion treatment, electroplating, impact plating, and a combination of these.

A tubular threaded joint according to the present invention is preferably used for connecting oil country tubular goods.

The present invention also relates to a method of connecting a plurality of oil country tubular goods without applying a lubricating grease using the above-described tubular threaded joint.

A tubular threaded joint according to the present invention impose little burden on the global environment because the lubricating coating formed on the contact surface does not contain harmful heavy metals such as lead unlike compound grease. Nevertheless, the lubricating coating exhibits a large ΔT like conventional compound grease, thereby making it possible to perform makeup without the occurrence of yielding or galling of the shoulder portions even when makeup is carried out with a high torque. Furthermore, galling can be suppressed even under severe conditions such as encountered during unstable drilling in the sea. Moreover, a tubular threaded joint according to the present invention suppresses the formation of rust, its lubricating performance lasts even when makeup and breakout are repeated, and it can guarantee gas tightness after makeup.

MODES FOR CARRYING OUT THE INVENTION

Below, a tubular threaded joint according to the present invention will be explained in detail by way of example.

Figure 4:
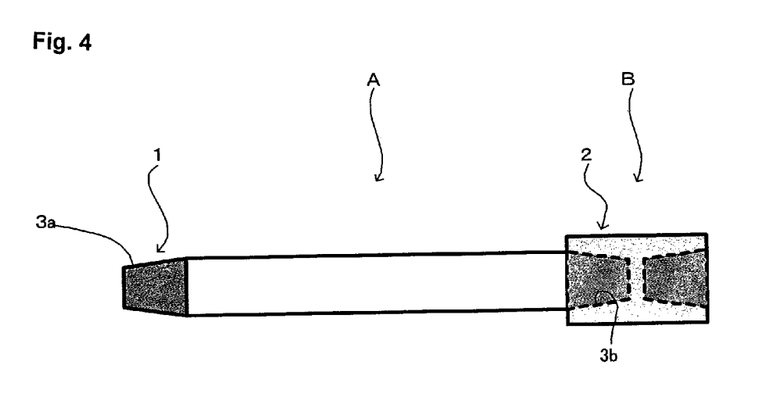
FIG. 4 schematically shows the assembled structure of a steel pipe and a coupling at the time of shipment of the steel pipe.

FIG. 4 schematically shows the state of a steel pipe for an oil country tubular good and a coupling at the time of shipment. A pin 1 having male threads 3a on its outer surface is formed on both ends of a steel pipe A, and a box 2 having female threads on its inner surface is formed on both sides of a coupling B. A pin means a member of a threaded joint having male threads, and a box means a member of a threaded joint having female threads. The coupling B is previously connected to one end of the steel pipe A. Although not shown in the drawing, protectors for protecting the threads are mounted on the unconnected pin of the steel pipe A and the unconnected box of the coupling B prior to shipment. These protectors are removed prior to use of the threaded joint.

As shown in the drawing, in a typical tubular threaded joint, a pin is formed on the outer surface of both ends of a steel pipe, and a box is formed on the inner surface of a coupling which is a separate component. There are integral tubular threaded joints which do not use a coupling and which have a pin on one end of a steel pipe and a box on the other end thereof. A tubular threaded joint according to the present invention can be either of these types of threaded joint.

Figure 5:
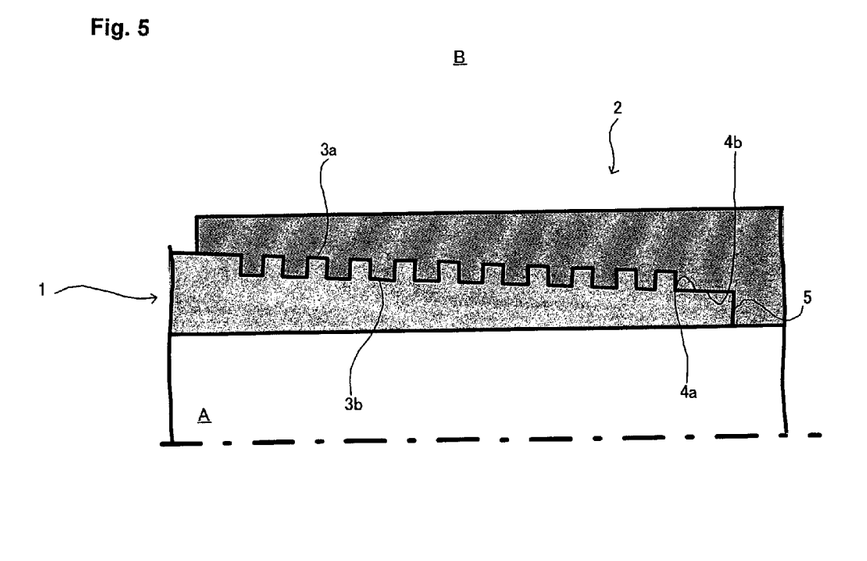
FIG. 5 schematically shows the connecting portions of a threaded joint.

FIG. 5 schematically shows the structure of a typical tubular threaded joint (referred to below simply as a threaded joint). The threaded joint is constituted by a pin 1 formed on the outer surface of the end of a steel pipe A and a box 2 formed on the inner surface of a coupling B. The pin 1 has male threads 3a, a seal portion 4a positioned at the end of the steel pipe, and a shoulder portion 5 on the end surface of the pipe. Correspondingly, the box 2 has female threads 3b, and a seal portion 4b and a shoulder portion 5 to the rear of the threads. The seal portion and the shoulder portion of each of the pin and the box constitute an unthreaded metal contact portion.

The threads 3a and 3b, the seal portions 4a and 4b, and the shoulder portions 5 (namely, the threads and the unthreaded metal contact portions) of the pin 1 and the box 2 are the contact surfaces of the threaded joint. These contact surfaces are required to have galling resistance, gas tightness, and corrosion resistance. In the past, for this purpose, a compound grease containing heavy metal powders was applied, or a viscous liquid or semisolid lubricating coating was formed on the contact surfaces. However, as stated above, the former had the problem that it had an adverse effect on humans and the environment, and the latter had the problem that when a high torque was applied during makeup, there was the possibility of the shoulder portions yielding prior to the completion of makeup due to a small $\Delta T$.

Figure 6:
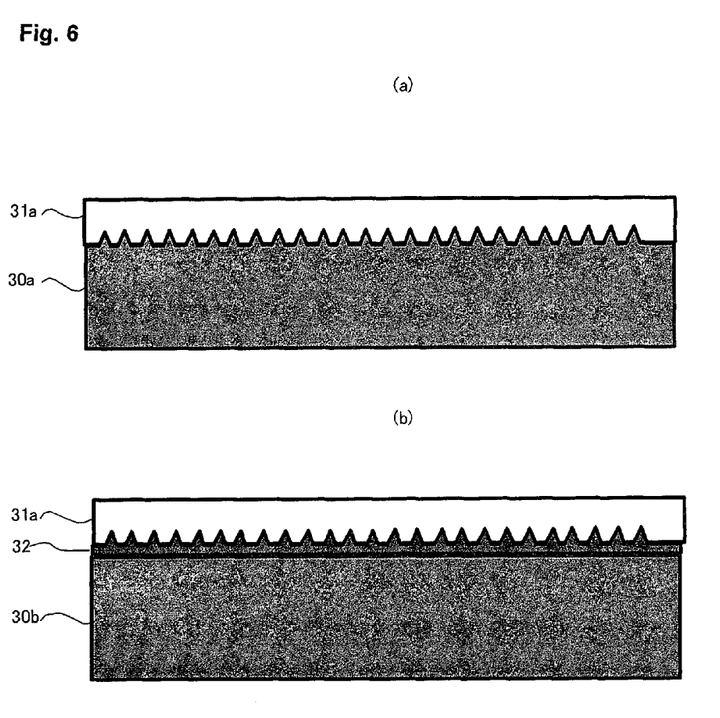
FIGS. 6(a) and 6(b) are explanatory views showing a contact surface of a tubular threaded joint according to the present invention, FIG. 6(a) showing an example of surface roughening of a contact surface itself, and FIG. 6(b) showing an example of forming a preparatory surface treatment coating for surface roughening of a contact surface.

According to the present invention, as shown in FIGS. 6(a) and 6(b) with respect to seal portions, the contact surface of at least one of the pin and the box is coated with a lubricating coating 31a atop steel surface 30a or 30b. This lubricating coating 31a exhibits the same excellent lubricating properties and effect of maintaining gas tightness at the time of makeup of a threaded joint as a conventional compound grease. Therefore, a threaded joint according to the invention can prevent galling of a threaded joint and maintain gas tightness after makeup without yielding of the shoulder portions even when makeup and breakout are repeated with a high torque without using a compound grease.

The substrate for the lubricating coating 31a (namely, the contact surface of the threaded joint) is preferably given a rough surface. As shown in FIG. 6(a), surface roughening may be achieved by direct surface roughening of the steel surface 30a by blasting or pickling. Alternatively, as shown in FIG. 6(b), it can be achieved by forming a preparatory surface treatment coating 32 having a rough surface on the steel surface 30b prior to forming the lubricating coating 31a.

The lubricating coating 31a can be formed by preparing a lubricating coating-forming composition which if necessary is diluted with a suitable organic solvent and applying it by a suitable method such as brush application, spraying, or immersion, if necessary followed by drying to evaporate the solvent.

Figure 3:
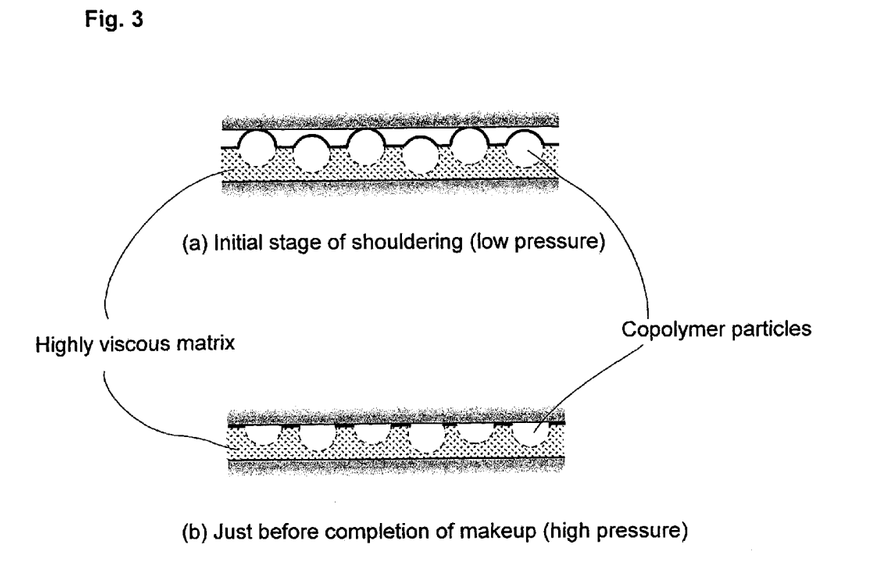
FIGS. 3(a) and 3(b) schematically show the mechanism of operation of a lubricating coating according to the present invention.

A lubricating coating may be formed on the contact surfaces of both a pin and a box, but for a pin and a box which are connected to each other prior to shipment as shown in FIG. 3, it is sufficient to form a lubricating coating on the contact surface of just one of the pin and the box. In this case, it is easier to perform preparatory surface treatment and application for forming a lubricating coating on a short coupling than on a long steel pipe, so it is convenient to form a lubricating coating on the contact surface of a coupling (usually on the contact surface of a box). For a pin and a box which are not connected prior to shipment, it is preferable to form a lubricating coating on the contact surfaces of both of a pin and a box in order to simultaneously impart lubricating properties and rust preventing properties to the surfaces. As a result, the lubricating properties and gas tightness of the threaded joint can be prevented from worsening due to rust formation.

The lubricating coating should cover the entirety of the contact surface of the pin and/or the box, but the present invention also includes the case in which only a portion of the contact surface (such as only the unthreaded metal contact portion) is coated.

[Lubricating Coating]

In order to prevent galling at the time of makeup of steel pipes by a threaded joint and to prevent rusting during storage, a lubricating coating is formed on the contact surface of at least one of the pin and the box of a threaded joint. In the present invention, in order to form a lubricating coating which has a large $\Delta T$ sufficient to prevent yielding of the shoulder portions even when makeup is carried out with a high torque and which can prevent the occurrence of galling and the occurrence of rusting during storage, a lubricating coating is formed so as to have a structure in which particular low friction copolymer particles are dispersed in a highly viscous matrix.

A coating containing particles of a silicone resin or a fluorocarbon resin (namely, a low friction resin) exhibits a low friction. However, with such a lubricating coating which contains these particles made solely of a low friction resin, since the bonding strength of the particles to the coating is not sufficient, the particles tend to easily drop off when subjected to a frictional force. As a result, even though the lubricating properties are initially good, the wear resistance and durability of the coating decrease due to particles dropping off, and good lubricating properties cannot be maintained.

Therefore, in the present invention, particles of a copolymer obtained by copolymerizing the low friction resin with another resin (such as an acrylic resin or a urethane resin) having a high affinity for the highly viscous matrix of the lubricating coating are used. Use of such copolymer particles increases the affinity of the particles for the highly viscous matrix and for the metal to be coated (contact surface of a threaded joint) and hence the adhesion of the lubricating coating, and good lubricating properties can be maintained.

Such low friction copolymer particles can be prepared by a copolymerization reaction between a monomer of another resin and a low friction resin having into which a functional group which is reactive with this monomer has been introduced. The functional group which can be introduced into a low friction resin (such as a silicone resin or a fluorocarbon resin) can be a (meth)acrylic group in the case of copolymerization with an acrylic resin, a hydroxyl group in copolymerization with a urethane resin, an epoxy group, a carboxyl group, or a hydroxyl group in copolymerization with a polyester resin, a phenolic group in copolymerization with a polycarbonate resin, an amino group in copolymerization with a polyimide resin, and a hydroxyl group in copolymerization with a thermoplastic epoxy resin.

It is particularly advantageous to use acrylic-silicone copolymer particles as copolymer particles in the present invention. These are particles of a copolymer of a silicone resin with an acrylic monomer and can be prepared by copolymerizing a polyorganosiloxane having a terminal free radically polymerizable group (such as a (meth)acrylic group) with a (meth)acrylate ester. The proportion of the polyorganosiloxane and the (meth)acrylate ester in this copolymer is preferably 60-80:20-40 as a mass ratio. The size of the copolymer particles is preferably such that the average particle diameter is in the range of 10-400 μm.

Copolymerization can be carried out by emulsion polymerization or the like using a suitable liquid medium and a free radical polymerization initiator. The resulting copolymer in the form of an emulsion is subjected to solid-liquid separation so as to recover the solids, and the desired copolymer particles are obtained in the form of secondary particles which are aggregates of the minute particles in the emulsion (primary particles). In the present invention, the particles and particle diameter mean the secondary particles and the particle diameter of the secondary particles, respectively. The shape of the copolymer particles may be either amorphous or spherical, but preferably it is spherical, i.e., the particles are preferably spherical particles.

In the present invention, spherical acrylic-silicone copolymer particles having an average particle diameter of 10-50 μm are particularly preferred. Spherical acrylic-silicone copolymer particles having an average particle diameter of 30 μm are sold by Nissin Chemical Industry Co., Ltd. under the product name Chaline R-170S. This product can be used as low friction copolymer particles in the present invention.

The content of low friction copolymer particles and preferably acrylic-silicone copolymer particles in a lubricating coating is preferably 0.2-20 mass %. If the content is less than 0.2 mass %, the above-described effects of the present invention cannot be adequately obtained. On the other hand, if the content exceeds 20 mass %, the uniformity of dispersion of the particles in the highly viscous matrix and the adhesion and film-forming properties of the coating decrease, and it may become difficult to form a quality coating. A more preferred content of the copolymer particles is 1-15 mass %.

The lubricating coating has a highly viscous matrix having a complex shear viscosity of at least 3000 Pa-sec at 25° C. Complex shear viscosity is measured in accordance with ITS K 7244-10: 2005 (Plastics—Determination of dynamic mechanical properties—Part 10—Complex shear viscosity using a parallel plate oscillatory rheometer). For example, viscosity can be measured using an ARES viscoelastic rheometer manufactured by TA Instruments, with the measurement mode being a twisting mode (parallel plate 25 mm) and the measurement frequency being 1 Hz.

Examples of substances capable of forming a matrix exhibiting a high viscosity with a complex shear viscosity at 25° C. of at least 3000 Pa-sec are one or more substances selected from rosin-based substances including rosin and its derivatives, waxes, metal soaps, and basic metal salts of an aromatic organic acid.

Of these substances, rosin-based substances are effective at increasing the coefficient of friction of a lubricant layer, namely, at increasing ΔT, while waxes, metal soaps, and basic metal salts of an aromatic organic acid are primarily effective at preventing galling of a lubricating coating. Accordingly, a highly viscous matrix is preferably a mixture of a rosin-based substance with one or more of a wax, a metal soap, and a basic metal salt of an aromatic organic acid. This highly viscous matrix is more preferably a mixture containing at least one of each of a rosin-based substance, a wax, a metal soap, and a basic metal salt of an aromatic organic acid. These components will be explained below.

A rosin-based substance selected from rosin and its derivatives in the lubricating coating is effective at increasing the ΔT of the coating by increasing its viscosity when it is subjected to a high pressure on a frictional surface. Rosin is a natural resin secreted from trees of the pine family and is constituted by the three elements carbon, hydrogen, and oxygen. Its main components are a resin acid (rosin acid) having the formula $C_{20}H_{30}O_2$ and colophonic acids having the formula $C_nH_{n+10}O_4$. Typical resin acids are abietic acid and d- or l-pimaric acid.

Depending upon the method of collection, rosin can be classified as tall rosin, gum rosin, and wood rosin. Any of these types may be used. Various rosin derivatives such as rosin esters, hydrogenated rosins, polymerized rosins, and disproportionated rosins are commercially available, and these rosin derivatives may be used as rosin-based substances.

The content of a rosin-based substance in the lubricating coating is preferably at most 30 mass %. If the content exceeds 30 mass %, the composition which is used for coating formation becomes highly viscous and the ease of forming a coating may be worsened. In order to adequately obtain the above-described effects of a rosin-based substance, the content of rosin in the lubricating coating is preferably at least 5 mass %. A more preferred content is 5-20 mass %.

The lubricating coating in a tubular threaded joint according to the present invention preferably does not contain heavy metals. The reason why compound grease which has been used for lubrication of tubular threaded joints contains large amounts of powder of soft heavy metals such as lead and zinc is for the purpose of preventing galling by inhibiting direct contact between metals. In the present invention, this function are provided by cooperation of a rosin-based substance and other constituents of the highly viscous matrix together with the copolymer particles contained in the lubricating coating. Therefore, the coating can exhibit a sufficient lubricating performance without containing any heavy metals.

Wax not only has the effect of preventing galling by decreasing the friction of a lubricating coating but it also decreases the fluidity of the lubricating coating and increases the coating strength. Any of animal, vegetable, mineral, and synthetic waxes can be used. Examples of waxes which can be used are beeswax and whale tallow (animal waxes); Japan wax, carnauba wax, candelilla wax, and rice wax (vegetable waxes); paraffin wax, microcrystalline wax, petrolatum, montan wax, ozokerite, and ceresin (mineral waxes); and oxide wax, polyethylene wax, Fischer-Tropsch wax, amide wax, and hardened castor oil (castor wax) (synthetic waxes). Of these, paraffin wax with a molecular weight of 150-500 is preferred.

The wax content in a lubricating coating is preferably at most 20 mass %. If the content exceeds 20 mass %, the adhesion and strength of a lubricating coating may decrease. The content is preferably at most 15 mass %. There is no particular lower limit on the wax content, but it is preferably at least 2% in order to obtain the above-described effects of wax with certainty.

A metal soap which is a salt of a fatty acid with a metal other than an alkali metal can be contained in a lubricating coating in order to increase the antigalling effect and rust preventing effect of the lubricating coating. The upper limit on its content in a coating is 20 mass %. If its content exceeds 20 mass %, the adhesion and strength of a lubricating coating may decrease. Preferably the content is at most 15 mass %. There is no particular lower limit on the content of a metal soap, but in order to be able to obtain the above-described effects with certainty, the content of a metal soap is preferably at least 2 mass %.

The fatty acid portion of a metal soap is preferably one having 12-30 carbon atoms from the standpoint of lubricating properties and rust prevention. The fatty acid can be either saturated or unsaturated. Mixed fatty acids derived from natural oils or fats such as beef tallow, lard, wool fat, palm oil, rapeseed oil, and coconut oil, and a single carboxylic acid compound such as lauric acid, tridecyclic acid, myristic acid, palmitic acid, lanopalmitic acid, stearic acid, isostearic acid, oleic acid, elaidic acid, arachic acid, behenic acid, erucic acid, lignoceric acid, lanoceric acid, a sulfonic acid, or salicylic acid may be used. The metal salt is preferably in the form of a calcium salt, but it may also be a salt of another alkaline earth metal or a zinc salt. The salt may be either a neutral salt or a basic salt.

Like a metal soap, a basic metal salt of an aromatic organic acid may be contained in a lubricating coating in order to increase the antigalling effect and the rust preventing effect of a lubricating coating. Examples of basic metal salts of aromatic organic acids are basic metal sulfonates, basic metal salicylates, basic metal phenates, and basic metal carboxylates. These basic metal salts of aromatic organic acids are each a salt constituted by an aromatic organic acid and a stoichiometrically excessive amount of an alkali (an alkali metal or an alkaline earth metal). At room temperature, they are a grease or a semisolid substance having the excess alkali dispersed as a colloidal microparticles in oil. These basic metal salts of aromatic organic acids exhibit a marked heavy-duty corrosion preventing effect, and at the same time they exhibit a lubricating activity by physical adsorption of the excess metal salt in the faun of colloidal microparticles and by chemical adsorption of organic acid groups.

The alkali which constitutes the cationic portion of the basic metal salt of an aromatic organic acid may be an alkali metal or an alkaline earth metal, but preferably it is an alkaline earth metal and particularly calcium, barium, or magnesium. The same effect can be obtained whichever of these is employed.

The higher the basicity of the basic metal salt of an aromatic organic acid, the greater the amount of the microparticles of the metal salt which function as a solid lubricant, and the better the lubricating properties (galling resistance) which can be imparted by the lubricating coating. When the basicity exceeds a certain level, the salt has the effect of neutralizing acid components, and the rust preventing effect of the lubricating coating is increased. For these reasons, the basic metal salt of an aromatic organic acid preferably has a base number (JIS K 2501) (when using two or more salts, the weighted average of the base numbers of the salts taking their weights into consideration) is preferably at least 50 mg KOH/g.

However, if it has a base number exceeding 500 rug KOH/g, it increases the hydrophilicity of a coating and decreases the rust preventing properties thereof. A preferred base number is 100-500 mg KOH/g, and more preferably it is in the range of 250-450 mg KOH/g.

As stated above, a basic metal salt of an aromatic organic acid is in the form of a grease or a semisolid substance, and it can function as the matrix of a lubricating coating. Therefore, its content in the lubricating coating may be a large amount up to 65 mass %. A preferred content is 10-60 mass %, and a more preferred content is 40-55 mass %.

In the present invention, in order to suppress the fluidity of the lubricating coating at high temperatures and further improve galling resistance, graphite can be contained in the lubricating coating as a friction modifier. It is preferable that the graphite used be amorphous (earthy) graphite which does not produce a significant decrease in the coefficient of friction of a coating.

The content of graphite in the lubricating coating is preferably 0.5-20 mass %. If it is less than 0.5 mass %, the effect of preventing galling is sometimes inadequate. On the other hand, if it exceeds 20 mass %, the graphite may interfere with the dispersibility of the copolymer particles and with the effect on friction at a high makeup pressure (which produces an increased Ty).

In order to increase the uniformity of particulate components in the lubricating coating or to improve the properties or appearance of the lubricating coating, the lubricating coating may include components other than those described above, such as one or more components selected from organic resins and various lubricants and additives normally used in lubricating oils (such as an extreme pressure agent). Lubricants refer to lubricating components which are liquid at room temperature and which can be used in lubricating oils (including viscous liquids such as grease). Examples of lubricants which can be used include synthetic esters, natural oils and fats, and mineral oils.

An organic resin and particularly a thermoplastic resin suppresses tackiness of the lubricating coating and increases the thickness of the coating, and when it is introduced into a frictional interface, it increases galling resistance and decreases friction between contacting metal portions even when a high makeup torque (a high to pressure) is applied. Therefore, it may be contained in a lubricating coating.

Examples of thermoplastic resins are polyethylene resins, polypropylene resins, polystyrene resins, poly(methyl acrylate) resins, styrene-acrylate copolymer resins, polyamide resins, and polybutene (polybutylene) resins. A copolymer or blend of these resins or these resins and other thermoplastic resins can also be used. It is preferable to use a thermoplastic resin having a density (JIS K 7112) in the range of 0.9-1.2. In addition, in view of the necessity for the resin to readily deform at a functional surface in order to exhibit lubricating properties, the thermal deformation temperature (JIS K 7206) of the resin is preferably 50-150° C. A preferable resin is a polybutene resin since it has a high viscosity under a high pressure.

By incorporating a thermoplastic resin in the form of particles in a lubricating coating, the resin exhibits a lubricating action similar to a solid lubricant when it is introduced into a frictional interface, and it is particularly effective at increasing galling resistance. Therefore, a thermoplastic resin is preferably present in the lubricating coating in the form of a powder and particularly a powder having spherical particles. In this case, if the composition used for forming the lubricating coating contains an organic solvent, a thermoplastic resin which does not dissolve in the solvent is selected. The powder of the thermoplastic resin can be dispersed or suspended in the solvent. It does not matter if the resin swells in the solvent.

The powder of the thermoplastic resin preferably has a fine particle diameter from the standpoints of increasing the coating thickness and increasing galling resistance. However, if the particle diameter is smaller than 0.05 μm, gelling of the lubricating coating-forming composition becomes marked, and it becomes difficult to form a coating having a uniform thickness. If the particle diameter exceeds 30 μm, it becomes difficult to introduce the resin particles into the frictional interface and the particles easily separate by sedimentation or floating in the lubricating coating-forming composition, and it becomes difficult to form a uniform coating. Accordingly, the particle diameter of the resin particles is preferably in the range of 0.05-30 μm and more preferably in the range of 0.07-20 μm.

When the lubricating coating contains a thermoplastic resin, the content thereof in the coating is preferably at most 10 mass % and more preferably in the range of 0.1-5 mass %. The total amount of the above-described rosin-based substance and the thermoplastic resin is preferably at most 30 mass %.

Examples of natural oils and fats which can be used as a lubricant include beef tallow, lard, wool fat, palm oil, rapeseed oil, and coconut oil. A mineral oil (including a synthetic mineral oil) having a viscosity at 40° C. of 10-300 cSt can also be used as a lubricant.

A synthetic ester which can be used as a lubricant can increase the plasticity of the thermoplastic resin and at the same time can increase the fluidity of the lubricating coating when subjected to hydrostatic pressure. In addition, a synthetic ester with a high melting point can be used to adjust the melting point and hardness (softness) of the lubricating coating. Examples of a synthetic ester are fatty acid monoesters, dibasic acid diesters, and fatty acid esters of trimethylolpropane or pentaerythritol.

Examples of fatty acid monoesters are monoesters of a carboxylic acid having 12-24 carbon atoms with a higher alcohol having 8-20 carbon atoms. Examples of dibasic acid diesters are diesters of a dibasic acid having 6-10 carbon atoms with a higher alcohol having 8-20 carbon atoms. Examples of the fatty acids in fatty acid esters of trimethylolpropane or pentaerythritol are those having 8-18 carbon atoms.

When a lubricating coating contains at least one of the above lubricants, the content thereof is preferably at least 0.1 mass % in order to obtain an increase in galling resistance. The content is preferably at most 5 mass % in order to prevent a decrease in the coating strength.

An extreme pressure agent has the effect of increasing the galling resistance of the lubricating coating when added in a small amount. Nonlimiting examples of an extreme pressure agent are sulfurized oils, polysulfides, phosphates, phosphites, thiophosphates, and dithiophosphoric acid metal salts. When an extreme pressure agent is contained in a lubricating coating, its content is preferably in the range of 0.05-5 mass %.

Examples of preferred sulfurized oils are compounds having a sulfur content of 5-30 mass % which is obtained by adding sulfur to an unsaturated animal or vegetable oil such as olive oil, castor oil, rice bran oil, cottonseed oil, rapeseed oil, soy bean oil, corn oil, beef tallow, or lard and heating the mixture.

Examples of preferred polysulfides are polysulfides of the formula: $R_1$—(S)c-$R_2$ (wherein $R_1$ and $R_2$ may be the same or different and indicate an alkyl group, an aryl group, an alkylaryl group, or an arylalkyl group each having 4-22 carbon atoms, and c is an integer from 2 to 5) and olefin sulfides containing 2-5 bonded sulfur atoms per molecule. Dibenzyl disulfide, di-tert-dodecyl polysulfide, and di-tert-nonyl polysulfide are particularly preferred.

Phosphates, phosphites, thiophosphates, and dithiophosphoric acid metal salts may be of the following general formulas:

phosphates: $(R_3O)(R_4O)P(=O)(OR_5)$ phosphites: $(R_3O)(R_4O)P(OR_5)$ thiophosphates: $(R_3O)(R_4O)P(=S)(OR_5)$ dithiophosphoric acid metal salts: $[(R_3O)(R_6O)P(=S)—S]_2$-M In the above formulas, $R_3$ and $R_6$ indicate an alkyl group, a cycloalkyl group, an alkylcycloalkyl group, an aryl group, an alkylaryl group, or an arylalkyl group each having up to 24 carbon atoms, $R_4$ and $R_5$ indicate a hydrogen atom or an alkyl group, a cycloalkyl group, an alkylcycloalkyl group, an aryl group, an alkylaryl group, or an arylalkyl group each having up to 24 carbon atoms, and M indicates molybdenum (Mo), zinc (Zn), or barium (Ba).

Particularly preferred examples include tricresyl phosphate and dioctyl phosphate for phosphates; tristearyl phosphite, tridecyl phosphite, and dilauryl hydrogen phosphite for phosphites; trialkyl thiophosphate in which each of $R_3$, $R_4$, and $R_5$ is an alkyl group having 12 or 13 carbon atoms and alkyltriphenyl thiophosphate for thiophosphates; and zinc dialkyl dithiophosphate in which each of $R_3$ and $R_6$ is a primary or secondary alkyl group having 3-20 carbon atoms for dithiophosphoric acid metal salts.

A lubricating coating is formed by preparing a mixture of the constituents of the coating in liquid faun by the addition of a solvent and/or by heating and then applying the resulting liquid to the contact surface of at least one of the pin and the box of a threaded joint, and if necessary drying the coating.

Application after heating can be carried out by the so-called hot melt coating method. A mixture of the constituents of a lubricating coating is heated to obtain a viscosity suitable for application and is sprayed at the surface to be coated using a spray gun having a temperature-maintaining mechanism. The surface being coated is preferably preheated to roughly the same temperature of the coating composition.

When application is carried out at room temperature, a lubricating coating-forming composition is prepared by adding a volatile solvent to a mixture of the constituents of a lubricating coating. The volatile solvent evaporates during the course of forming a coating, and substantially none of the solvent remains in the lubricating coating. "Volatile" means that the solvent shows a tendency to vaporize when present in the form of a coating at a temperature from room temperature to 150° C. However, since a lubricating coating according to the present invention may be a viscous liquid or a semisolid, it is permissible for a slight amount of a solvent to remain in the coating.

There is no particular restriction on the type of solvent. Examples of volatile solvents which are suitable for use in the present invention are petroleum-derived solvents such as Solvent and mineral spirits which belong to industrial gasoline prescribed by JIS K 2201, aromatic petroleum naphtha, xylene, and Cellosolves. Two or more of these may be used in combination. A solvent having a flash point of at least 30° C., an initial boiling point of 150° C. or higher, and a final boiling point of 210° C. or lower is preferred because it is relatively easy to handle and it rapidly evaporates thereby leading to a short drying time.

In addition to the above-described components, the lubricating coating-forming composition may contain additives such as an antioxidant, a preservative, and a colorant.

The viscosity of the lubricating coating-forming composition (kinematic viscosity in cSt measured by a Brookfield viscometer) may be appropriately selected in accordance with the coating method. The viscosity is preferably at most 4000 cSt at 40° C. in the case of spray coating or immersion at room temperature or at most 1000 cSt at 60° C. in the case of brush coating.

The lubricating coating-forming composition can be prepared by first heating some components such as wax of the highly viscous matrix in which the copolymer particles are dispersed to a temperature of at least their melting point to melt them, and then mixing the melt with the other components. Alternatively, the composition can be prepared by dissolving or dispersing all of the components in an organic solvent without melting wax.

The thickness of the lubricating coating is preferably in the range of 10-500 μm for the following reasons. The lubricating coating is preferably sufficiently thick to cover minute gaps in the contact surface area such as spaces between threads. If the coating thickness is too small, the effects of supplying components such as a rosin-based substance, a wax, a metal soap, a basic metal salt of an aromatic organic acid, and graphite to the frictional surface from other gaps due to hydrostatic pressure generated at the time of makeup can no longer be expected. For this reason, the thickness of the lubricating coating is preferably at least 10 μm.

At the time of carrying out makeup which requires lubrication, the contact surfaces of the box and the pin contact each other. Therefore, from the standpoint of lubrication, it is sufficient to form a lubricating coating on the contact surface of just one of the pin and the box. However, from the standpoint of preventing rusting of the pin and the box when they are exposed to the atmosphere during storage, it is preferable to form a lubricating coating on the contact surfaces of both the pin and the box. The minimum coating thickness necessary for rust prevention is also 10 μm. Accordingly, when a separate protecting means for preventing rusting (such as previously connecting a pin and a box to each other or mounting a protector) is not employed, a coating having a thickness of at least 10 μm is preferably formed on the contact surfaces of both the pin and the box.

On the other hand, if the lubricating coating is too thick, not only is lubricant wasted, but the prevention of environmental pollution, which is one of the objects of the present invention, is impeded. From this standpoint, the thickness of the lubricating coating preferably has an upper limit of around 500 μm. A preferred thickness of the lubricating coating is 15-200 μm. However, as explained below, when the surface roughness of the underlying contact surface (substrate) is increased, the thickness of the lubricating coating is preferably larger than Rmax of the substrate. When the substrate has a rough surface, the thickness of the lubricating coating is the average value of the coating thickness of the entire coating, which can be calculated from the surface area, the mass, and the density of the coating.

As a general tendency, when the lubricating coating contains more than a certain amount of a lubricant, it becomes a viscous liquid, while if the amount of a lubricant is small or there is no lubricant, it becomes a semisolid.

[Preparatory Surface Treatment]

If a tubular threaded joint having a lubricating coating formed on the contact surfaces of the pin and/or the box according to the present invention undergoes preparatory surface treatment for surface roughening of the contact surfaces to which the coating is applied such that the surface roughness is larger than the surface roughness obtained by machining (3-5 μm), the galling resistance often increases. Accordingly, prior to forming a lubricating coating, preparatory surface treatment for surface roughening is preferably performed on the contact surface to be coated with the lubricating coating.

Examples of such preparatory surface treatment are blasting by projecting blasting materials such as spherical shot or angular grit, pickling by immersion in a strongly acidic solution such as sulfuric acid, hydrochloric acid, nitric acid, or hydrofluoric acid to roughen the skin, chemical conversion treatment such as phosphate treatment, oxalate treatment, or borate treatment (the roughness of the crystal surface increases as the crystals which are formed develop), electroplating with a metal such as Cu, Fe, Sn, or Zn or an alloy thereof (projections are selectively plated, so the surface becomes slightly rougher), and impact plating which can form a porous plated coating. Composite plating which forms an electroplated coating having minute solid particles dispersed in metal may also be employed as a method of imparting a roughened surface because the minute solid particles protrude from the plated coating.

Whichever preparatory surface treatment method is used for the contact surfaces, the surface roughness Rmax resulting from surface roughening by preparatory surface treatment is preferably 5-40 μm. If Rmax is less than 5 μm, the adhesion and retention of the lubricating coating may become inadequate. On the other hand, if Rmax exceeds 40 μm, friction increases, and the coating may be unable to withstand shearing forces and compressive forces when a high pressure is applied, thereby causing the coating to be easily destroyed or peeled off. Two or more types of preparatory surface treatment for surface roughening may be employed. The treatment can be carried out in a conventional manner.

From the standpoint of the adhesion of the lubricating coating, preparatory surface treatment which can form a porous coating, namely, chemical conversion treatment and impact plating are preferred. With these methods, in order to make to Rmax of the porous coating at least 5 μm, the coating thickness is preferably made at least 5 μm. There is no particular upper limit on the coating thickness, but normally at most 50 μm and preferably at most 40 μm is sufficient. The formation of a lubricating coating atop a porous coating which has been formed by preparatory surface treatment can increase the adhesion of the lubricating coating by the so-called "anchor effect". As a result, it becomes difficult for peeling of the solid lubricating coating to take place under repeated makeup and breakout with contact between metals being effectively prevented, and galling resistance, gas tightness, and corrosion resistance are further increased.

Particularly preferred types of preparatory surface treatment for forming a porous coating are phosphating treatment (treatment with manganese phosphate, zinc phosphate, iron manganese phosphate, or zinc calcium phosphate) and impact plating to form a zinc or zinc-iron alloy coating as a porous metal plating. A manganese phosphate coating is preferable from the standpoint of adhesion, and a zinc or zinc-iron alloy coating which can be expected to provide a sacrificial corrosion preventing effect by zinc is preferable from the standpoint of corrosion resistance.

Phosphating treatment can be carried out by immersion or spraying in a conventional manner. An acidic phosphating solution which is normally used for zinc plated steel materials can be used. For example, a zinc phosphating solution comprising 1-150 g/L of phosphate ions, 3-70 g/L of zinc ions, 1-100 g/L of nitrate ions, and 0-30 g/L of nickel ions can be used. It is also possible to use a manganese phosphating solution which is normally used for threaded joints. The temperature of the solution can be from room temperature to 100° C., and the duration of treatment may be up to 15 minutes depending upon the desired coating thickness. In order to promote the formation of a coating, prior to phosphating treatment, an aqueous surface conditioning solution containing colloidal titanium can be supplied to the surface to be treated. After phosphating treatment, washing is preferably performed with cold or warm water followed by drying.

Impact plating can be carried out by mechanical plating in which particles are impacted with a material to be plated inside a rotating barrel, or by blast plating in which particles are impacted against a material to be plated using a blasting apparatus. In the present invention, since it is sufficient to plate just the contact surface, it is preferable to employ blast plating which can perform localized plating.

For example, a blasting material in the form of particles having an iron core coated with zinc or a zinc alloy is blasted against the contact surface to be coated. The content of zinc or a zinc alloy in the particles is preferably in the range of 20-60 mass %, and the diameter of the particles is preferably in the range of 0.2-1.5 mm. Blasting of the particles causes only the zinc or zinc alloy which is the coating layer of the particles to adhere to the contact surface, and a porous coating made of zinc or a zinc alloy is formed atop the contact surface. This impact plating can form a porous metal plated coating having good adhesion to a steel surface regardless of the composition of the steel.

From the standpoints of both corrosion resistance and adhesion, the thickness of the zinc or zinc alloy layer formed by impact plating is preferably 5-40 μm. If it is less than 5 μm, adequate corrosion resistance cannot be obtained, while if it exceeds 40 μm, the adhesion of the lubricating coating formed thereon may end up decreasing. Similarly, the thickness of a phosphate coating is preferably in the range of 5-40 μm.

Two or more of the above-described types of preparatory surface treatment may be combined.

As another type of preparatory surface treatment, although it produces almost no surface roughening, certain types of electroplating in one or more layers may improve the adhesion of the lubricating coating to the substrate and may improve the galling resistance of a tubular threaded joint.

Examples of such preparatory surface treatment for a lubricating coating are electroplating with Cu, Sn, Ni, or alloys of these metals. Plating may be single-layer plating or multiple-layer plating with two or more layers. Specific examples of these types of electroplating are single plating with Cu, Sn, Ni, the Cu—Sn alloy disclosed in JP 2003-74763 A, and Cu—Sn—Zn alloy, two-layer plating by Cu plating and Sn plating, and three-layer plating by Ni plating, Cu plating, and Sn plating. In the case of a tubular threaded joint made from a steel having a Cr content exceeding 5% which is highly susceptible to galling, it is preferable to carry out preparatory surface treatment in the form of single-layer plating with a Cu—Sn alloy or a Cu—Sn—Zn alloy, or multiple-layer plating having two or more layers with metals selected from these alloys, Cu, Sn, and Ni (e.g., two-layer plating by Cu to plating and Sn plating, two-layer plating by Ni plating and Sn plating, two-layer plating by Ni plating and Cu—Sn—Zn alloy plating, and three-layer plating by Ni plating, Cu plating, and Sn plating).

These types of plating can be fanned by the method described in JP 2003-74763 A. In the case of multiple-layer plating, the lowermost layer of is plating (usually Ni plating) is preferably an extremely thin plating layer with a thickness of less than 1 μm which is referred to as strike plating. The plating thickness (the overall thickness in the case of multiple-layer plating) is preferably in the range of 5-15 μm.

It is also possible to foam a solid corrosion protecting coating as another type of preparatory surface treatment.

[Upper Dry Coating]

The above-described lubricating coating sometimes has some tackiness on its surface. In this case, particularly when an oil country tubular good is placed vertically, rust remaining on the inner surface or blasting particles which were blasted in order to remove rust fall off, and they may adhere to the lubricating coating and become embedded in the lubricating coating. Foreign matter that becomes embedded in a coating cannot be completely removed by blowing with air, and it worsens the lubricating properties of the coating. In order to eliminate this problem, a thin dry solid coating may be formed atop the lubricating coating. This dry solid coating can be a usual resin coating (such as an epoxy resin, a polyamide resin, a polyamide-imide resin, or a vinyl resin) and it can be formed from either a water-based composition or an organic solvent-based composition. The coating may also contain a small amount of wax.

[Surface Treatment of the Opposing Member]

When a lubricating coating according to the present invention is formed on the contact surface of only one of the pin and the box (e.g., the box) of a tubular threaded joint, the contact surface of the other member (e.g., the pin) which is not coated with a lubricating coating may be left untreated, but preferably it is roughened by the above-described preparatory surface treatment for surface roughening. Thus, the surface roughening can be carried out by blasting treatment; pickling; chemical conversion treatment such as with a phosphate, oxalate, or borate; electroplating, composite plating to form a plated coating containing minute solid particles; and a combination of two or more of these methods. By doing so, when the other member is connected to a member having a lubricating coating according to the present invention, the contact surface of the other member which does not have a lubricating coating exhibits good retention of the lubricating coating due to the anchor effect provided by surface roughening, and the galling resistance of the tubular threaded joint is increased.

If desired, in order to impart rust preventing properties, a known corrosion protecting coating such as a coating of an ultraviolet curing resin or a thermosetting resin can be foamed atop the surface prepared by the preparatory surface treatment. The corrosion protecting coating prevents the contact surface from contacting the atmosphere. Therefore, even if water is formed due to condensation during storage of a threaded joint and it contacts the joint, rust is prevented from developing on the contact surface of the joint.

There are no particular limitations on surface treatment of the contact surface of the opposing member of a threaded joint, and it is possible to carry out surface treatment other than that described above. For example, a lubricating coating other than one according to the present invention may be formed on the contact surface of the opposing member.

EXAMPLES

The effects of the present invention will be illustrated by the following examples and comparative examples. In the following explanation, the contact surface of a pin including the male threads and the unthreaded metal contact portion will be referred to as the pin surface, and the contact surface of a box including the female threads and the unthreaded metal contact portion will be referred to as the box surface. The surface roughness of a lubricating coating is expressed as Rmax.

The pin surface and the box surface (each having threads, a seal portion, and a shoulder portion) of a special threaded joint (outer diameter: 17.78 cm (7 inches), wall thickness: 1.036 cm (0.408 inches) made from the carbon steel A, the Cr—Mo steel B, or the 13% Cr steel C shown in Table 1 (galling took place more readily in the order from steel A to steel C) underwent the preparatory surface treatment to shown in Table 2. The surface roughness R of the surface prepared by the preparatory surface treatment shown in Table 2 was the average value of ten-point heights of irregularities.

A lubricating coating having the composition shown in Table 3 was formed by spray coating of a lubricating coating-forming composition on the pin surface and the box surface which had undergone preparatory surface treatment. For the lubricating coatings of Example 4 and Comparative Example 3 which were solid at room temperature, in accordance with the hot melt method, a lubricating coating-forming composition not containing a solvent (having the same composition as the lubricating coating) was heated to 130° C. at the time of use, the pin surface or the box surface to be coated was preheated to 130° C. by induction heating, and the lubricating coating-forming composition was applied using a spray gun having a temperature maintaining mechanism. In this case, a lubricating coating was formed by cooling. In the other examples, a lubricating coating-forming composition diluted with a volatile organic solvent (mineral spirits) was prepared and was applied by spray coating at room temperature. After application, the volatile solvent was evaporated by air drying to form a lubricating coating.

The content of the components in each lubricating coating shown in Table 3 is the mass % with respect to the total amount of nonvolatile components (exclusive of a volatile solvent) in a lubricating coating-forming composition. A lubricating coating having the same composition was formed on the pin surface and the box surface.

Of the components shown in Table 3, the spherical copolymer particles were acrylic-silicone copolymer particles (Chaline R-170S of Nissin Chemical Industry Co., Ltd., average particle diameter of 30 µm) which had a low friction. Of the components used to form a highly viscous matrix, the rosin-based substance was a hydrogenated rosin ester (Ester Gum H manufactured by Arakawa Chemical Industries, Ltd.) which was a rosin ester, the wax was paraffin wax manufactured by Nippon Seiro Co., Ltd., the metal soap was calcium stearate manufactured by DIC Corporation, and the basic metal salt of an aromatic organic acid was Calcinate C-400CLR manufactured by Crompton Corporation (a highly basic calcium sulfonate having a base number of 400 mg KOH/g). The friction modifier was amorphous graphite (Blue P manufactured by Nippon Graphite Industries, Ltd.). The volatile organic solvent used for dilution in the case of spray coating at room temperature was Cleansol which was mineral spirits manufactured by Nippon Oil Corporation.

A test in which makeup and breakout were repeated for up to 10 times was is carried out on a tubular threaded joint having a lubricating coating formed in the above-described manner on the pin surface and the box surface to evaluate galling resistance.

In the repeated makeup and breakout test, makeup of a threaded joint was carried out at a makeup speed of 10 rpm and a makeup torque of 20 kN-m, and after breakout, the state of seizing of the pin surface and the box surface was visually evaluated. When a damage caused by seizing was observed but it was not severe and was repairable, repair was performed and makeup and breakout were continued. The results of the makeup and breakout test are shown in Table 4.

Separately from the above test, a threaded joint sample was prepared under the same conditions, and by carrying out makeup with a high makeup torque, a torque chart like that shown in FIG. 2 was prepared, and Ts (shouldering torque), Ty (yield torque), and $\Delta T$ (=Ty−Ts, torque-on-shoulder resistance) were determined on the torque chart. Ts was the torque at the start of interference of the shoulder portions. Specifically, Ts was the torque when the change in the torque which appeared after interference of the shoulder portions occurred began to enter the linear region (elastic deformation region). Ty was the torque at the start of plastic deformation. Specifically, Ty was the torque when the change in torque after reaching Ts began to lose linearity as the rotation proceeds.

Table 4 shows the relative value of $\Delta T$ (=Ty−Ts) when the value of $\Delta T$ obtained in the case of a conventional compound grease shown by Comparative Example 1 of Table 3 is assigned a value of 100. A value of $\Delta T$ which is greater than 100 means that $\Delta T$ was greater than when compound grease was applied, and accordingly it was possible to perform makeup without yielding of the shoulder portions and without the occurrence of galling even with a high makeup torque. This means that galling can be suppressed even under severe conditions such as occur during unstable excavation operations in the sea.

Separately, the coefficient of friction at an applied pressure of each of 0.3 GPa and 1 GPa was measured by the above-mentioned FALEX method using a pin and two vee blocks prepared in accordance with ASTM D-2670, D-2625, D-3233, and D-5620. The pin having a diameter of 6.35 mm (¼ inches) was made of the same steel as the threaded joint to be tested and underwent the same preparatory surface treatment and formation of a lubricating coating as the pin surface of the joint. The vee blocks each having a V-shaped groove with an angle of 96° and a width of 6.35 mm (¼ inches) were made of the same steel as the threaded joint to be tested and underwent the same preparatory surface treatment and formation of a lubricating coating as the box surface of the joint. The value of $\Delta \mu$ which is the difference calculated by subtracting the coefficient of friction at a low pressure (0.3 GPa) from the coefficient of friction at a high pressure (1 GPa) is shown in Table 3. A negative value of $\Delta \mu$ indicates that the coefficient of friction measured at a high pressure is lower than that measured at a low pressure.

TABLE 1

Steel composition of threaded joints (mass %, remainder is Fe and impurities)

| Steel type | C | Si | Mn | P | S | Cu | Ni | Cr | Mo |
|---|---|---|---|---|---|---|---|---|---|
| A | 0.24 | 0.3 | 1.3 | 0.02 | 0.01 | 0.04 | 0.07 | 0.17 | 0.04 |
| B | 0.25 | 0.25 | 0.8 | 0.02 | 0.01 | 0.04 | 0.05 | 0.95 | 0.18 |
| C | 0.19 | 0.25 | 0.8 | 0.02 | 0.01 | 0.04 | 0.1 | 13 | 0.04 |

TABLE 2

| | Preparatory surface treatment | | Steel |
|---|---|---|---|
| No. | Pin | Box | type |
| Example 1 | 1. Finish grinding (R = 3)<br>2. Zn phosphate (R = 8) (t = 12) | 1. Finish grinding (R = 3)<br>2. Mn phosphate (R = 12) (t = 15) | A |
| Example 2 | Sand blasting (R = 10) | 1. Finish grinding (R = 3)<br>2. Ni strike plating + Cu plating (t = 12) (R = 3) | C |
| Example 3 | 1. Finish grinding (R = 3)<br>2. Zn phosphate (R = 8) (t = 12) | 1. Finish grinding (R = 3)<br>2. Ni strike plating + Cu—Sn—Zn alloy plating (t = 7) (R = 2) | B |
| Example 4 | 1. Finish grinding (R = 3)<br>2. Zn phosphate (R = 8) (t = 12) | 1. Finish grinding (R = 3)<br>2. Ni strike plating + Cu—Sn—Zn alloy plating (t = 7) (R = 2) | B |

TABLE 2-continued

| | Preparatory surface treatment | | Steel |
|---|---|---|---|
| No. | Pin | Box | type |
| Comp. 1 | 1. Finish grinding (R = 3)<br>2. Zn phosphate (R = 8) (t = 12) | 1. Finish grinding (R = 3)<br>2. Mn phosphate (R = 12) (t = 15) | A |
| Comp. 2 | 1. Finish grinding (R = 3)<br>2. Zn phosphate (R = 8) (t = 12) | 1. Finish grinding (R = 3)<br>2. Mn phosphate (R = 10) (t = 12) | B |
| Comp. 3 | 1. Finish grinding (R = 3)<br>2. Zn phosphate (R = 8) (t = 12) | 1. Finish grinding (R = 3)<br>2. Mn phosphate (R = 12) (t = 15) | A |

R: surface roughness (μm),
t: coating thickness (μm)

TABLE 3

| | Composition of lubricating coating (values in parentheses indicate content in mass %) | | | | | | Amount of organic solvent per 100 parts solids | $\Delta\mu^{1)}$ |
|---|---|---|---|---|---|---|---|---|
| | | Composition of highly viscous matrix | | | | | | |
| No. | Spherical copolymer particles | Rosin-based substance | Wax | Metal soap | Basic metal salt of aromatic organic acid | Complex shear viscosity at 25° C. (Pa-s) | Friction modifier | |
| Ex. 1 | Acrylic-silicone copolymer particles (5) | rosin ester (18) | paraffin wax (8) | Ca stearate (18) | highly basic Ca sulfonate (51) | 3920 | none | 30 parts | 0.05 |
| Ex. 2 | Acrylic-silicone copolymer particles (5) | rosin ester (17) | paraffin wax (8) | Ca stearate (17) | highly basic Ca sulfonate (48) | 5580 | graphite (5) | 30 parts | 0.03 |
| Ex. 3 | Acrylic-silicone copolymer particles (10) | rosin ester (16) | paraffin wax (8) | Ca stearate (16) | highly basic Ca sulfonate (45) | 5280 | graphite (5) | 30 parts | 0.08 |
| Ex. 4 | Acrylic-silicone copolymer particles (10) | rosin ester (15) | paraffin wax (8) | Ca stearate (15) | highly basic Ca sulfonate (42) | 6130 | graphite (10) | none | 0.07 |
| Comp. 1 | Compound grease specified by API Bulletin 5A2 (contains heavy metals such as lead, harmful to humans and environment but has good lubricating properties) | | | | | | | 0.02 |
| Comp. 2 | none | rosin ester (15) | paraffin wax (10) | Ca stearate (17) | highly basic Ca sulfonate (48) | 5880 | graphite (10) | 30 parts | −0.05 |
| Comp. 3 | none | rosin ester (15) | paraffin wax (10) | Ca stearate (17) | highly basic Ca sulfonate (48) | 5880 | graphite (10) | none | −0.06 |

[1)] $\Delta\mu$ = (coefficient of friction at 1 GPa) minus (coefficient of friction at 0.3 GPa); a negaive value of $\Delta\mu$ indicates that the coefficient of friction at 1 GPa (at a high pressure) is lower than that at 0.3 GPa (at a low pressure).

TABLE 4

| No. | | Results of makeupbreakout test[1)] | $\Delta T$ ratio (=Ty − Ts) (%)[2)] |
|---|---|---|---|
| Examples | 1 | 10 times | 117 |
| | 2 | 10 times | 110 |
| | 3 | 10 times | 130 |
| | 4 | 10 times | 128 |
| Comparative Examples | 1 | 10 times | 100 |
| | 2 | 10 times | 50 |
| | 3 | 10 times | 52 |

[1)]Number of cycles without problems
[2)]The $\Delta T$ ratio is the value relative to $\Delta T$ for Comparative Example 1, which was assigned a value of 100

Example 1

The following surface treatment was carried out on a special threaded joint made up of the carbon steel having composition A shown in Table 1.

The box surface which had been finished by machine grinding (surface roughness of 3 μm) was immersed for 10 minutes in a manganese phosphating solution at 80-95° C. to form a manganese phosphate coating with a thickness of 15 μm (surface roughness of 12 μm). The lubricating coating composition of Example 1 shown in Table 3 (100 parts of the indicated composition was diluted with 30 parts of an organic solvent) was applied by spraying to the box surface. After evaporation of the solvent, a lubricating coating with a thickness of 50 μm was formed. In the examples, all the parts are parts by mass unless otherwise indicated.

The pin surface which had been finished by machine grinding (surface roughness of 3 μm) was immersed for 10 minutes in a zinc phosphating solution at 75-85° C. to form a zinc phosphate coating having a thickness of 12 μm (surface roughness of 8 μm). A lubricating coating which was identical to that on the box surface was formed on the pin surface.

The value of $\Delta\mu$ was 0.05, which was greater than that of a conventional compound grease (0.02 in Comparative Example 1), indicating that the coefficient of friction at a high pressure becomes much higher than that at a low pressure.

The value of $\Delta T$ in a high torque test (indicated below as the $\Delta T$ ratio) was 117% of the value of $\Delta T$ in Comparative Example 1, which was assigned a value of 100. The $\Delta T$ ratio was greatly increased compared to the $\Delta T$ ratio of around 50% for Comparative Examples 2 and 3, which did not contain low friction spherical particles (acrylic-silicone copolymer particles). Moreover, it was found that the $\Delta T$ for Example I was greater than for a conventional compound grease (Comparative Example 1). Accordingly, it was ascertained that this threaded joint could be made up with a high torque without the occurrence of yielding of the shoulder portions. In addition, in a makeup and breakout test, makeup and breakout could be performed 10 times without the occurrence of galling.

Example 2

The following surface treatment was carried out on a special threaded joint made of the 13% Cr steel having composition C shown in Table 1.

The box surface which had been finished by machine grinding (surface roughness of 3 μm) was subjected to electroplating by first Ni strike plating and then by Cu plating to form a plated coating with a total thickness of 12 μm. The lubricating coating-forming composition of Example 2 shown in Table 3 (100 parts of the indicated composition were diluted with 30 parts of an organic solvent) was applied by spraying to the box surface to form a lubricating coating with a thickness of 52 μm after evaporation of the solvent.

The pin surface was given a surface roughness of 10 μm by sand blasting with No. 80 sand, and the same composition as was used on the box surface was applied to the pin surface to form a lubricating coating with a thickness of 50 μm.

The value of Δμ was 0.03. In a high torque test, the ΔT ratio was 110%, and it was confirmed that a higher torque ratio than in any of the comparative examples was obtained in the same manner as in Example 1. Of course, makeup and breakout could be carried out 10 times in the makeup and breakout test without any problems.

Example 3

The following surface treatment was carried out on a special threaded joint made of the Cr—Mo steel having composition B shown in Table 1.

The box surface which had been finished by machine grinding (surface roughness of 3 μm) was subjected to electroplating first by Ni strike plating and then by Cu—Sn—Zn alloy plating to faun a plated coating having an overall thickness of 7 μm. On the box surface, the lubricating coating-forming composition of Example 3 shown in Table 3 (100 parts of the indicated composition were diluted with 30 parts of an organic solvent) was applied by spraying. After evaporation of the solvent, a lubricating coating with a thickness of 100 μm was formed.

The pin surface which had been finished by machine grinding (surface roughness of 3 μm) was immersed for 10 minutes in a zinc phosphating solution at 75-85° C. to form a zinc phosphate coating with a thickness of 12 μm (surface roughness of 8 μm). A lubricating coating with a thickness of 100 μm was formed on the pin surface in exactly the same manner as for the box surface.

The value of Δμ was a high value of 0.08. In the high torque test, it was is confirmed that the ΔT ratio was 130%, which was higher than in any of the comparative examples. In the makeup and breakout test, makeup and breakout could be performed 10 times without any problems.

Example 4

The following surface treatment was performed on a special threaded joint made of the Cr—Mo steel having composition B shown in Table 1.

The box surface which had been finished by machine grinding (surface roughness of 3 μm) was subjected to electroplating first by Ni strike plating and then by Cu—Sn—Zn alloy plating to form a plated coating with an overall thickness of 7 μm. The box surface which underwent this preparatory surface treatment was then preheated to 130° C. by induction heating, and the lubricating coating-forming composition of Example 4 shown in Table 3 which was heated to 130° C. was applied to the preheated box surface with a spray gun having a temperature maintaining mechanism. After cooling, a lubricating coating with a thickness of 50 μm was formed.

The pin surface which had been finished by machine grinding (surface roughness of 3 μm) was immersed for 10 minutes in a zinc phosphating solution at 75-85° C. to form a zinc phosphate coating having a thickness of 12 μm (surface roughness of 8 μm). A lubricating coating having a thickness of 50 μm was formed in exactly the same manner as for the box surface on the pin surface.

The value of Δμ was a high value of 0.07. In a high torque test, the ΔT ratio was 128%, and it was confirmed that the ΔT ratio was higher than in any of the comparative examples. In the makeup and breakout test, makeup and breakout could be performed 10 times without any problems.

As can been seen from the above results, there is a correlation between Δμ and ΔT. Thus, there is the tendency that the greater the Δμ, the greater the ΔT. In other words, by measurement of Δμ, by the FALEX method, for example, using small test pieces, it is possible to predict the value of ΔT of a threaded joint and hence makeup performance with a high torque thereof.

Comparative Example 1

The following surface treatment was performed on a special threaded joint made of the carbon steel having composition A shown in Table 1.

The box surface which had been finished by machine grinding (surface roughness of 3 μm) was immersed for 10 minutes in a manganese phosphating solution at 80-95° C. to form a manganese phosphate coating with a thickness of 15 μm (surface roughness of 12 μm). A viscous liquid compound grease specified by API standards was applied to the box surface to form a lubricating coating (the total coating weight on the pin and the box was 50 grams, and the total coated area was roughly 1400 $cm^2$).

The pin surface which had been finished by machine grinding (surface roughness of 3 μm) was immersed for 10 minutes in a zinc phosphating solution at 75-85° C. to form a zinc phosphate coating with a thickness of 12 μm (surface roughness of 8 μm), and then the above-described compound grease was applied to the pin surface in the above-described amount.

The value of Δμ was 0.02. As shown in Table 4, in a makeup and breakout test, in 10 cycles of makeup and breakout, there was no apparent occurrence of galling up to the 10th cycle. However, the compound grease in this example contained heavy metal powder such as lead, so it could be considered harmful to humans and the environment. In a high torque test, it had a high value of Ty without the occurrence of yielding of the shoulder portions even when makeup was carried out with a high torque, and it exhibited a high value of ΔT. ΔT at this time was given a value of 100, and ΔT of the examples was compared to this value.

Comparative Example 2

The following surface treatment was performed on a special threaded joint made of the Cr—Mo steel having composition B of Table 1.

The box surface which had been finished by machine grinding (surface roughness of 3 μm) was immersed for 10 minutes in a manganese phosphating solution at 80-95° C. to form a manganese phosphate coating with a thickness of 12 μm (surface roughness of 10 μm). The lubricating coating-forming composition of Comparative Example 2 in Table 3 (prepared by diluting 100 parts of the indicated composition with 30 parts of an organic solvent) which contained amorphous graphite but did not contain acrylic-silicone copolymer particles was applied to the box surface by spraying. After evaporation of the solvent, a lubricating coating with a thickness of 80 μm was formed.

The pin surface which had been finished by machine grinding (surface roughness of 3 μm) was immersed for 10 minutes in a zinc phosphating solution at 75-85° C. to form a zinc phosphate coating with a thickness of 12 μm (surface roughness of 8 μm), and the same composition as for the box surface was sprayed on the pin surface in the same manner as for the box surface to form a lubricating coating having a thickness of 80 μm.

The value of Δμ was −0.05, indicating that the coefficient of friction at a high pressure is lower than that at a low pressure. As shown in Table 4, in the makeup and breakout test, there was no occurrence of galling in 10 cycles of makeup and breakout, and the results were extremely good. However, in the high torque test, the ΔT ratio was an extremely low value of 50% compared to conventional compound grease. Namely, it was confirmed that the ΔT ratio was not improved at all with only a coating made from a highly viscous matrix and graphite.

Comparative Example 3

The following surface treatment was performed on a special threaded joint made of the carbon steel having composition A shown in Table 1.

The box surface which had been finished by machine grinding (surface roughness of 3 μm) was immersed for 10 minutes in a manganese phosphating solution at 80-95° C. to form a manganese phosphate coating with a thickness of 15 μm (surface roughness of 12 μm). The box surface was preheated to 130° C. by induction heating, and the lubricating coating-forming composition of Comparative Example 3 shown in Table 3 which was heated to 130° C. was applied to the preheated box surface with a spray gun having a temperature maintaining mechanism. After cooling, a lubricating coating with a thickness of 50 μm was formed.

The pin surface which had been finished by machine grinding (surface roughness of 3 μm) was immersed for 10 minutes in a zinc phosphating solution at 75-85° C. to form a zinc phosphate coating with a thickness of 12 μm (surface roughness of 8 μm). The same composition as for the box surface was then applied to the pin surface in the same manner as for the box surface to form a lubricating coating having a thickness of 50 μm.

The value of Δμ was −0.06, indicating that the coefficient of function at a high pressure is lower than that at a low pressure. As shown in Table 4, in the makeup and breakout test, there was no occurrence of galling in 10 cycles of makeup and breakout, and the results were extremely good. However, in the high torque test, the ΔT ratio was an extremely low value of 52% compared to a conventional compound grease.

In order to evaluate rust preventing properties which are necessary for a tubular threaded joint, the same preparatory surface treatment coating and lubricating coating as for the box shown in Tables 2 and 3 were formed on a separately prepared coupon test piece (70 mm×150 mm×1.0 mm thick). The test piece was subjected to a salt spray test (according to JIS Z 2371 (corresponding to ISO 9227), temperature of 35° C., duration of 1000 hours) and a humidity cabinet test (according to JIS K 5600-7-2 (corresponding to ISO 6270), temperature of 50° C., relative humidity of 98%, duration of 200 hours), and the occurrence of rusting was investigated. It was confirmed that there was no occurrence of rust through the end of either test with the threaded joints in the above examples.

In addition, when tubular threaded joints of each of the examples underwent a gas tightness test and an actual use test in an actual drilling apparatus, it was confirmed that an excellent lubricating coating having a higher ΔT than for a conventionally used compound grease was realized.

The present invention has been explained above with respect to embodiments which are considered to be preferred at the present time, but the present invention is not limited to the above-described embodiments. Variations which are not contrary to the concept of the invention as construed from the claims and the overall description are possible, and a threaded joint which incorporates such variations should be understood as being encompassed by the technical scope of the present invention.

The invention claimed is:

1. A tubular threaded joint comprising a pin and a box each having contact surface including threads and an unthreaded metal contact portion, characterized in that the contact surface of at least one of the pin and the box has a lubricating coating comprising particles of a copolymer of a resin selected from a silicone resin and a fluorocarbon resin with a thermoplastic resin, said particles being dispersed in a viscous matrix having a complex shear viscosity of at least 3000 Pa-sec at 25° C.

2. A tubular threaded joint as set forth in claim 1 wherein the copolymer particles are spherical particles.

3. A tubular threaded joint as set forth in claim 1 wherein the copolymer particles are acrylic-silicone copolymer particles having an average particle diameter of 10-50 μm, and their content is 0.1-20 mass %.

4. A tubular threaded joint as set forth in claim 1 wherein the viscous matrix comprises at least one substance selected from rosin-based substances including rosin and its derivatives, waxes, metal soaps, and basic metal salts of aromatic organic acids.

5. A tubular threaded joint as set forth in claim 1 wherein the lubricating coating further contains graphite as a friction modifier.

6. A tubular threaded joint as set forth in claim 1 wherein the lubricating coating has a thickness of 10-500 μm.

7. A tubular threaded joint as set forth in claim 1 wherein the contact surface of at least one of the pin and the box having the lubricating coating is subjected to surface treatment by a method selected from blasting, pickling, phosphate chemical conversion treatment, oxalate chemical conversion treatment, borate chemical conversion treatment, electroplating, impact plating, and a combination of these before forming the lubricating coating.

8. A tubular threaded joint as set forth in claim 1 wherein the contact surface of one of the pin and the box has the lubricating coating, and the contact surface of the other of the pin and the box has undergone surface treatment by at least one method selected from at least one of blasting treatment, pickling, phosphate chemical conversion treatment, oxalate chemical conversion treatment, borate chemical conversion treatment, electroplating, impact plating, and a combination of these.

9. A tubular threaded joint as set forth in claim 1 for connecting oil country tubular goods.

10. A method of connecting a plurality of oil country tubular goods without applying a lubricating grease using a tubular threaded joint as set forth in claim 1.

11. A tubular threaded joint as set forth in claim 1 wherein the coefficient of friction of the lubricating coating measured at a pressure of 1 GPa is greater than that measured at a pressure of 0.3 GPa.

12. A tubular threaded joint as set forth in claim 11 wherein the difference calculated by subtracting the coefficient of friction at 0.3 GPa from that at 1 GPa is at least 0.02.

* * * * *